US009292541B2

(12) United States Patent
Sim et al.

(10) Patent No.: US 9,292,541 B2
(45) Date of Patent: Mar. 22, 2016

(54) METHOD OF PROVIDING ONLINE INFORMATION USING IMAGE INFORMATION

(71) Applicant: ELECTRONICS AND TELECOMMUNICATIONS RESEARCH INSTITUTE, Daejeon (KR)

(72) Inventors: Jae Cheol Sim, Daejeon (KR); Kang Yong Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 365 days.

(21) Appl. No.: 13/850,634

(22) Filed: Mar. 26, 2013

(65) Prior Publication Data
US 2013/0272612 A1    Oct. 17, 2013

(30) Foreign Application Priority Data
Apr. 17, 2012    (KR) .................. 10-2012-0039556

(51) Int. Cl.
*G06K 9/00*    (2006.01)
*G06F 17/30*    (2006.01)

(52) U.S. Cl.
CPC ...... *G06F 17/30253* (2013.01); *G06K 9/00442* (2013.01); *G06K 9/00456* (2013.01)

(58) Field of Classification Search
USPC ....................................................... 382/176
See application file for complete search history.

(56) References Cited

U.S. PATENT DOCUMENTS

| 6,397,213 | B1* | 5/2002 | Cullen et al. | |
| 8,000,529 | B2* | 8/2011 | Chao et al. | 382/176 |
| 8,385,589 | B2* | 2/2013 | Erol et al. | 382/100 |
| 2006/0251292 | A1* | 11/2006 | Gokturk et al. | 382/103 |
| 2008/0002916 | A1* | 1/2008 | Vincent et al. | 382/305 |
| 2009/0324026 | A1 | 12/2009 | Kletter | |
| 2010/0246951 | A1* | 9/2010 | Chen et al. | 382/167 |
| 2011/0252315 | A1* | 10/2011 | Misawa et al. | 715/256 |

FOREIGN PATENT DOCUMENTS

| KR | 1020020072111 A | 9/2002 |
| KR | 1020080019960 A | 3/2008 |
| KR | 1020120001847 A | 1/2012 |
| WO | 2008/003095 A3 | 1/2008 |

* cited by examiner

*Primary Examiner* — Yon Couso
(74) *Attorney, Agent, or Firm* — Ladas & Parry LLP

(57) ABSTRACT

The present invention provides a method of providing online information using image, including separating each of a target image, received from a user terminal, and an original image, received from an information provider apparatus, into a text region and a graphic region; selecting an important text region from the text region; extracting features from the text region, the graphic region, and the important text region, respectively; searching for the original image corresponding to the target image using the features of the text region, the graphic region, and the important text region; and searching for supplementary information related to the retrieved original image and provided the retrieved supplementary information.

2 Claims, 8 Drawing Sheets

METHOD OF PROVIDING ONLINE INFORMATION USING IMAGE INFORMATION

CROSS-REFERENCES TO RELATED APPLICATIONS

The present application claims priority under 35 U.S.C. 119(a) to Korean Application No. 10-2012-0039556, filed on Apr. 17, 2012, in the Korean Intellectual Property Office, which is incorporated herein by reference in its entirety set forth in full.

BACKGROUND

Exemplary embodiments of the present invention relate to a method of providing online information using image information, and more particularly, to a method of providing online information using image, which searches for information, such as advertisements associated with an image that exists online, using an image in which graphic information and text information are mixed, such as a photograph provided by a user terminal, and provides the retrieved information.

As information service in the Internet is activated and smart terminals, such as smart phones and tablet PCs, are spread, the smart terminals are providing a variety of advertisements and pieces of information. Pieces of information in a smart terminal, however, are provided through a direct input to a user terminal or a Uniform Resource Locator (URL) input based on text. As a more advanced form that provides information, a search using an image or the providing of information using a Quick Response (QR) code is gradually being spread.

In the case of a QR code, however, information based on an image can be provided, but the information can be extracted from the QR code by recognizing the QR code only when the QR code is printed on a target medium or outputted. In the case of an image search, additional information, such as a QR code, does not need to be inserted into an image. The image search, which is optimized for an image, such as a photograph including a variety of objects, has very low accuracy in a printed advertisement, such as printed matter or an insertion, and includes lots of text as in a newspaper and a magazine.

Text that occupies most of an area is very similar in terms of an image in printed matter that is focused on text, such as a newspaper, and a printed advertisement, such as an insertion, commonly has a similar layout. If a common image search technique is applied to the printed advertisement without recognizing characters, it is very difficult to obtain meaningful features. Furthermore, character recognition is problematic in that handling for various languages is difficult, the accuracy of recognition is low, and processing costs are high.

As a background art related to the present invention, there is a Korean Patent Laid-Open Publication No. 10-2012-0001847 (Jan. 5, 2012), entitled 'System and Method for Searching Imaged'.

SUMMARY

An embodiment of the present invention relates to a method of providing online information using image, which searches for information, such as advertisements associated with an image that exists online, using an image in which graphic information and text information are mixed, such as a photograph provided by a user terminal, and provides the retrieved information.

In one embodiment, a method of providing online information using image includes separating each of a target image, received from a user terminal, and an original image, received from an information provider apparatus, into a text region and a graphic region; selecting an important text region from the text region; extracting features from the text region, the graphic region, and the important text region, respectively; searching for the original image corresponding to the target image using the features of the text region, the graphic region, and the important text region; and searching for supplementary information related to the retrieved original image and provided the retrieved supplementary information.

In the present invention, the separating of each of a target image, received from a user terminal, and an original image, received from an information provider apparatus, into a text region and a graphic region includes detecting the edges in the target image and the original image and extracting edges, forming strokes, based on the detected edges; obtaining quadrangles by integrating adjacent edges from among the extracted edges; identifying quadrangles placed near a straight line based on the center of the quadrangles; forming a group of quadrangles by integrating the identified quadrangles; and identifying the group of quadrangles as the text region and defining remaining regions other than the group of quadrangles as the graphic region.

In the present invention, the selecting of an important text region from the text region includes determining importance for each text region and selecting the important text region according to the determined importance.

In the present invention, the importance is determined based on the number of strokes, included in the text region, to an area of the text region.

In the present invention, the important text region has a minimum number of strokes per area, from among the text regions.

In the present invention, the extracting of features from the graphic region includes forming a graphic image formed of only the graphic region; filling each of pixels of the graphic region from which the text region has been deleted, with a mean value of pixels of a graphic region that is closest to the graphic region; and extracting the features of the graphic region by applying a feature extraction algorithm to the graphic image.

In the present invention, the extracting of features from the text region includes forming a text image composed of only the text region; filling the text region and the graphic region of the text image with a single present color; and extracting the features of the text region by applying a characteristic extraction algorithm for an image search to the text image.

In the present invention, in the extracting of features from the important text region, the features of the important text region are extracted by applying a feature extraction algorithm for an image search.

In the present invention, the searching of the original image corresponding to the target image using the features of the text region, the graphic region, and the important text region includes comparing the features of the graphic region, the features of the text region, and the features of the important text region for the original image with the features of the graphic region, the features of the text region, and the features of the important text region for the target image, respectively, and searching for the original image on a result of the comparison.

In the present invention, similarities between the features of the text region, the graphic region, and the important text region of the target image and those of the original image are determined based on a Euclidean distance.

In the present invention, if the Euclidean distance for each of the features of the text region, the graphic region, and the important text region between the target image and the original image is a preset threshold value or higher, it is determined that there is no matching original image.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Figure 1:
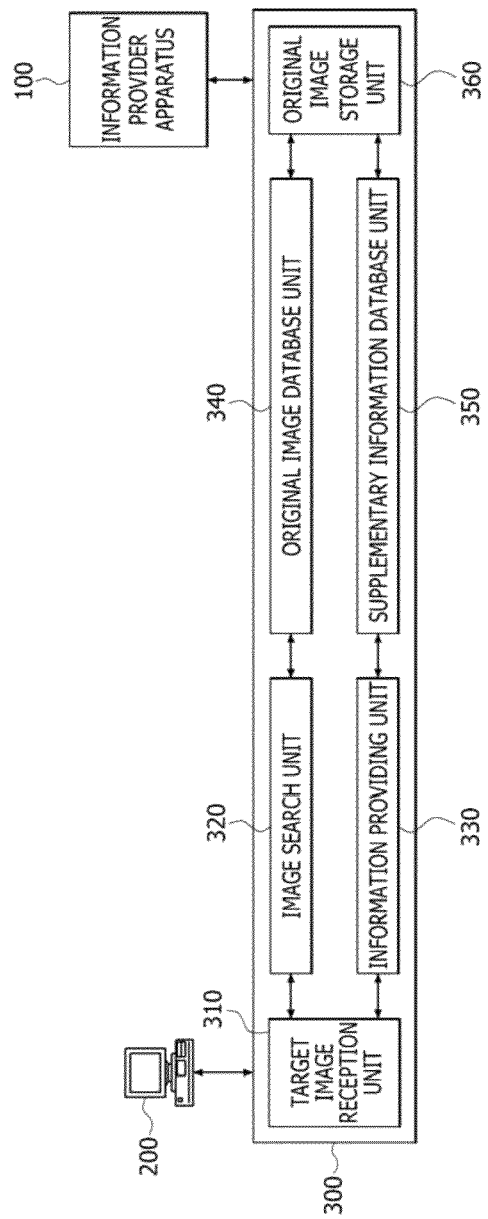
FIG. 1 is a block diagram of an apparatus for providing online information using image information in accordance with one embodiment of the present invention.

FIG. 1 is a block diagram of an apparatus for providing online information using image information in accordance with one embodiment of the present invention.

The apparatus for providing online information using image information in accordance with one embodiment of the present invention searches an original image for a target image provided by a user terminal 200 and provides various pieces of information related to the original image. The apparatus includes an information provider apparatus 100, the user terminal 200, and an image-based information providing apparatus 300.

The information provider apparatus 100 is provided in a sponsor or a newspaper publishing company and configured to provide pieces of information, such as a news item and an advertisement, which have been produced in a printed matter form or online.

The information provider apparatus 100 provides the user terminal 200 with an original image and supplementary information, corresponding to the original image, when the original image is searched for.

The user terminal 200 enables a user to search an original image for a target image, and supplementary information according to the search for the original image is provided to the user terminal 200. To this end, the user terminal 200 prepares for an image that is captured from the original image or selected online and provides the image to the image-based information providing apparatus 300.

The image-based information providing apparatus 300 searches an original image, provided by the information provider apparatus 100, for a target image provided by the user terminal 200 and provides the user terminal 200 with the retrieved original image and supplementary information corresponding to the original image.

The image-based information providing apparatus 300 includes a target image reception unit 310, an original image storage unit 360, an original image database unit 340, a supplementary information database unit 350, an image search unit 320, and an information providing unit 330.

The original image storage unit 360 receives an original image provided by the information provider apparatus 100 and supplementary information, such as an URL, corresponding to the original image, extracts the features of the original image from the original image, stores the extracted features in the original image database unit 340, and stores the supplementary information corresponding to the original image in the supplementary information database unit 350.

A Scale-invariant feature transform algorithm can be used as an image search technique which can be adopted in the original image storage unit 360. The Scale-invariant feature transform algorithm can extract the features of an image irrespective of a change of the size and distortion due to the direction of a camera and measure the similarities of images by only comparing the vectors of characteristic values with each other. A characteristic extraction algorithm and a search method for the image search are not limited to the above embodiment, and the technical scope of the present invention may include a variety of image search techniques.

The target image reception unit 310 receives a target image from the user terminal 200 and extracts the features of the target image from the received target image.

The image search unit 320 searches the original image database unit 340 based on features extracted by the target image reception unit 310 and identifies an original image corresponding to a target image based on the retrieved results.

The information providing unit 330 searches the supplementary information database unit 350 for supplementary information corresponding to an identified original image and transfers the retrieved supplementary information to the user terminal 200.

The original image database unit 340 stores the features of an original image extracted by the original image storage unit 360, and the supplementary information database unit 350 stores supplementary information corresponding to an original image.

A method of providing online information using image information in accordance with one embodiment of the present invention is described in detail below with reference to FIGS. 2 and 3.

Figure 2:
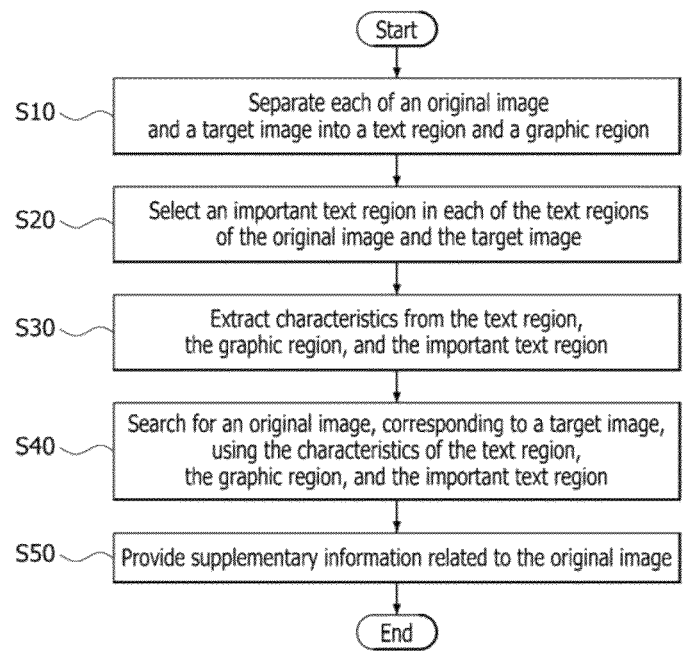
FIG. 2 is a flowchart illustrating a method of providing online information using image information in accordance with one embodiment of the present invention.
Figure 3:
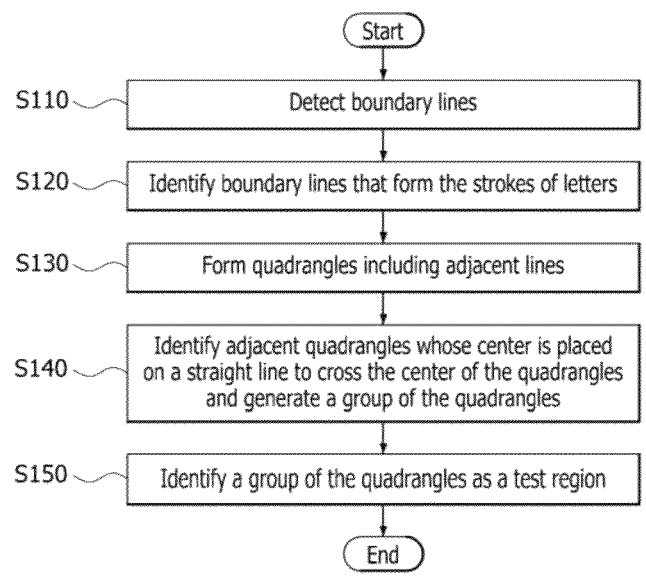
FIG. 3 is a diagram showing a process of identifying a text region in an image in accordance with one embodiment of the present invention.

FIG. 2 is a flowchart illustrating a method of providing online information using image information in accordance with one embodiment of the present invention, and FIG. 3 is a diagram showing a process of identifying a text region in an image in accordance with one embodiment of the present invention.

First, the original image storage unit 360 and the target image reception unit 310 separate an original image and a target image, respectively, into a text region and a graphic region, and each extract the features of the text region and the features of the graphic region at step S10.

The original image is first described as an example.

The text region is identified in the original image. More particularly, as shown in FIG. 3, in order to identify the text region, edges for the original image are detected at step S110.

In general, the results of the detection of a boundary line for a photograph having a consecutive change of color and the results of the detection of a boundary line for text have very different features. Accordingly, edges that form the strokes of letters are identified by classifying the features of the edges at step S120.

Next, adjacent lines for the strokes, from among the identified edges, are integrated, and quadrangles including the integrated lines are formed at step S130.

When the quadrangles are formed as described above, the center of the quadrangles is on a straight line that crosses the quadrangles. Adjacent quadrangles placed within a set range from the center of the quadrangles are searched for, and a group of quadrangles are generated by integrating the retrieved quadrangle at step S140. Here, a criterion for the proximity of a quadrangle can be the width in a vertical direction from the central line of the quadrangle which corresponds to the height of a letter.

When the group of quadrangles is generated as described above, the group of quadrangles is identified as a text region at step S150.

In particular, for an efficient search, an image that is excessively dark or bright can be normalized so that it has proper brightness and contrast, or preprocessing for making an edge clear, for example, can be performed on an original image. In this case, low image quality due to lighting and an improper focus when an image using a camera is used can be improved.

When the text region is identified as described above, importance for the identified text region is determined for each text region and an important text region is selected according to the importance at step S20.

Importance for each text region is determined according to the number of strokes of text, included in the text region, to an area on the basis of the area of the text region. That is, a text region having the smallest number of strokes per area is selected as an important text region. In extracting features by determining importance for each region, a preset number of text regions may be used depending on applications. For example, in general, in printed matter, such as a newspaper and a magazine, a title becomes the most important area, whereas in a printed advertisement, important regions can be distributed and disposed. Accordingly, features for a various number of text regions are extracted depending on applications.

Next, the original image is formed into an image, including a text image including only text regions and a graphic image from which text regions have been deleted, based on the identified text region, and features for the text region, the graphic region, and the important text region, respectively, are extracted at step S30.

First, in the graphic image, each of the pixels of an empty region from which text regions have been deleted is filled with the mean value of the pixels of the closest peripheral graphic region. Features are extracted from the graphic image by applying the existing characteristic extraction algorithm for an image search to the graphic image, and the characteristic vector of the graphic image is generated based on the extracted features. Accordingly, the features of the graphic image without text can be extracted.

In contrast, the text image includes only text regions. The text regions are filled with a single present color, for example, black, and the remaining graphic regions are filled with a single color, for example, white. Features are extracted from the text image constructed as described above by applying the existing characteristic extraction algorithm for an image search to the text image, and the characteristic vector of the text image is generated based on the extracted features. Accordingly, features according to the disposition of text are incorporated.

Furthermore, features are extracted from the important text region by applying an additional characteristic extraction algorithm for an image search to the important text region, and the characteristic vector of the important text region is generated based on the extracted features.

The text image characteristic vector, the graphic image characteristic vector, and the important text region characteristic vector extracted as described above become characteristic vectors that represent features unique to the original image.

The original image and the characteristic vector of the original image obtained as described above are stored in the original image database unit 340.

Furthermore, the target image reception unit 310 calculates the features of the target image in order to search the original image for the target image provided by the user terminal 200.

An interest region is identified in the target image. In this case, a region actually occupied by printed matter, from the target image, is identified. In order to identify the interest region, edges for the target image are detected, a boundary line having the greatest area on the basis of the center of a screen is searched for, and the inside of the retrieved boundary line is set as the interest region. If a plurality of pieces of independent information is gathered as in a newspaper or a collective advertisement, a plurality of pieces of information can be set as one interest region. In this case, in order to increase a search hit rate, an identified interest region may be sent to the user terminal 200 and fed back to a user so that the user can select the interest region directly.

A process of extracting the features of the interest region from the target image is the same as the process performed on the original image in the original image storage unit 360, and thus a detailed description thereof is omitted.

The image search unit 320 searches the original image database unit 340 for the original image, corresponding to the target image, using the features of the target image extracted as described above at step S40.

The image search unit 320 compares the features of the graphic image, the features of the text image, and the features of the important text region for the original image, stored in the original image database unit 340, with the features of the graphic image, the features of the text image, and the features of the important text region for the target image, respectively, and selects an original image having the highest similarity based on a result of the comparison.

The closest Euclidean distance is determined to have the highest similarity when calculating the Euclidean distances of the characteristic vectors, that is, the features of the graphic image, the features of the text image, and the features of the important text region of each of the target image and the original image. Here, in order to prevent erroneous recognition due to a match of some features, if a Euclidean distance for one or more vectors is a preset threshold value or higher, it is determined that there is no original image.

When the image search unit 320 searches for an original image as described above, the information providing unit 330 searches the supplementary information database unit 350 for supplementary information related to the retrieved original image and provides the retrieved supplementary information to the user terminal 200. Accordingly, a result of the search can be checked and service using the supplementary information can be provided.

Likewise, the image-based information search apparatus 300 can perform the above process on information that includes a plurality of text images and graphic images, such as a news item in a newspaper and a magazine.

In relation to computation service in which an image for each news item has been registered and printed or displayed on a computer screen, when a target image is received from the user terminal 200, the image-based information search apparatus 300 can make a search and provide service that is associated with a search for news items related to a corresponding news item or with an Internet search.

The present invention is described below with reference to FIGS. 4 to 10.

Figure 4:
FIG. 4 is an exemplary diagram of an original image in accordance with one embodiment of the present invention.
Figure 5:
FIG. 5 is an exemplary diagram of an image after detecting a boundary line in accordance with one embodiment of the present invention.

If it is sought to provide an advertisement in association with a newspaper news item, the information provider apparatus 100 registers the URL of an original image of a newspaper news item, such as that shown in FIG. 4, and an advertisement with the image-based information search apparatus 300.

The image-based information search apparatus 300 identifies a text region in an original image as shown in FIGS. 2 and 3. In this process, the image-based information search apparatus 300 can detect edges in the original image and obtain the results of the edges and an image, such as that shown in FIG. 5.

Figure 6:
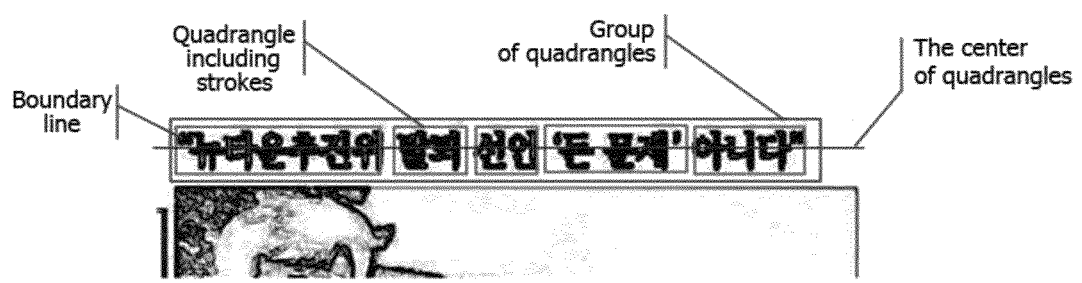
FIG. 6 is a diagram showing the results of the identification of a text region in accordance with one embodiment of the present invention.

Next, the image-based information search apparatus 300 identify the text region in such a manner that it obtains quadrangles including edges by integrating adjacent edges, from among the edges, and forms a group of the quadrangles by integrating the quadrangles again as shown in FIG. 6.

Figure 7:
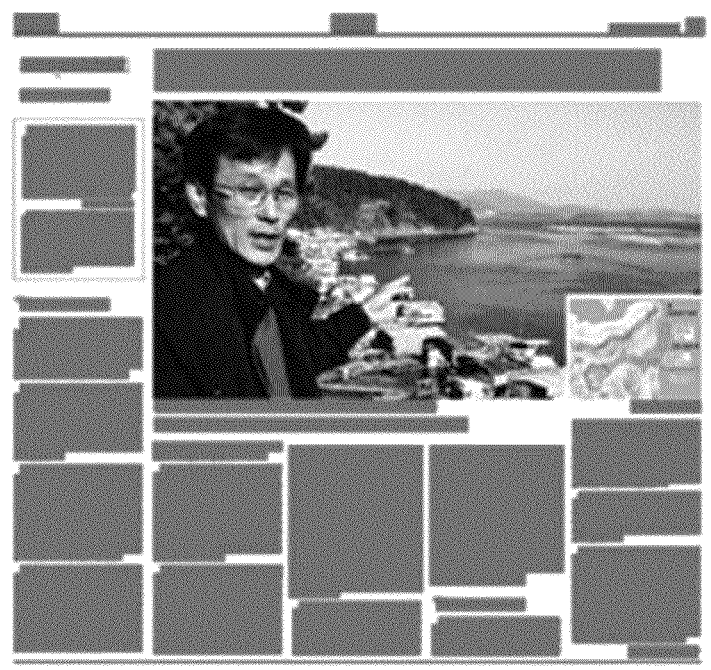
FIG. 7 is an exemplary diagram of an image in which a text region has been identified in accordance with one embodiment of the present invention.

When the text region is identified as described above, the image-based information search apparatus 300 obtains an image whose text regions have been identified and determines importance for the identified text regions as shown in FIG. 7.

Figure 8:
FIG. 8 is an exemplary diagram of an image in which an important text region has been identified in accordance with one embodiment of the present invention.

In this case, when a text region having the smallest line as compared with an area of the text region is selected, the title of a news item is selected and an important text region A is selected based on the selected title as shown in FIG. 8.

Figure 9:
FIG. 9 is an exemplary diagram of a text image from which graphic information has been deleted in accordance with one embodiment of the present invention.
Figure 10:
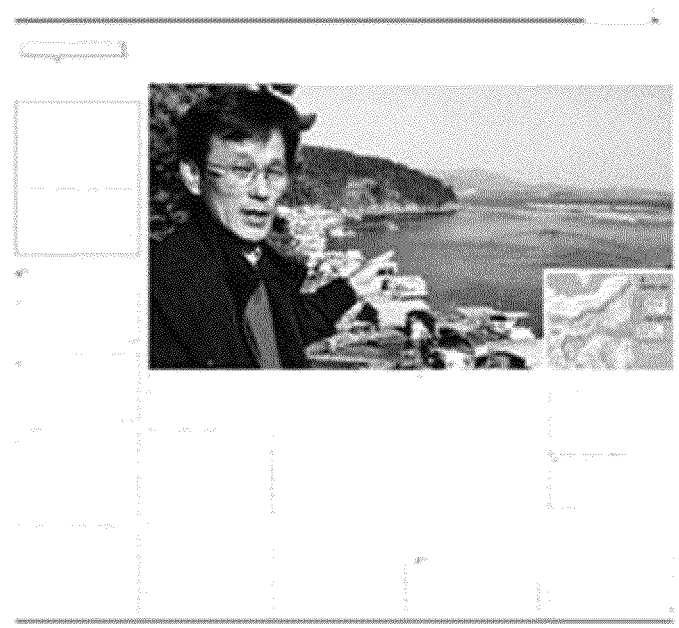
FIG. 10 is an exemplary diagram of a graphic image from which text regions have been deleted in accordance with one embodiment of the present invention.

When the important text region A is selected, a text image from which graphic information has been deleted, such as that shown in FIG. 9, and a graphic image from which the text region have been deleted, such as that shown in FIG. 9, are obtained.

Here, the features of the graphic image, the features of the text image, and the features of the important text region are obtained by performing a procedure of extracting features from an image of the important text region.

Characteristic vectors for the original image, together with the original image, are stored in the original image database unit 340, and supplementary information provided by the information provider apparatus 100, together with the original image, are stored in the supplementary information database unit 350. In this case, the same index as that of the original image can be assigned to the characteristic vectors, and thus the supplementary information can be searched for when the original image is subsequently searched for.

The information provider apparatus 100 registers the original image and the supplementary information with a system and provides the user terminal 200 with the original image in a printed matter form or online.

The user terminal 200 provides a target image captured by the camera of a mobile phone from the original image and provides the target image to the image-based information search apparatus 300.

The target image reception unit 310 of the image-based information search apparatus 300 obtains the characteristic vector of a graphic image, the characteristic vector of a text image, and the characteristic vector of an important text region for the target image by performing the same process as that of the original image storage unit 360 on the target image.

Here, the image search unit 320 searches the original image database unit 340 using the characteristic vector of the graphic image, the characteristic vector of the text image, and the characteristic vector of the important text region. The image search unit 320 obtains an original image that is most similar to the target image by calculating the Euclidean distances of the characteristic vector of the graphic region, the characteristic vector of the text region, and the characteristic vector of the important text region of each of the target image and the original image stored in the original image database unit 340.

When the original image is retrieved, the target image reception unit 310 searches the supplementary information database unit 350 for contents corresponding to the retrieved original image provided by the information providing unit 330 and provides the results of the search to the target image reception unit 310.

Thus, the target image reception unit 310 transfers the original image and the supplementary information to the user terminal 200 so that the user terminal 200 can check the results of the search for the original image.

A variety of services are possible depending on stored supplementary information. If a news item-related URL related to a newspaper news item has been stored as supplementary information, a result of a search for the related news item based on a printed newspaper news item can be provided to the user terminal 200. Furthermore, if a telephone number related to a printed advertisement has been stored as supplementary information, service that orders a sponsor from the printed advertisement is possible.

In accordance with the present invention, printed matter in which text and graphic are mixed can be efficiently searched for using the features of the printed matter, and various pieces of supplementary information, such as advertisements related to the printed matter, can be provided based on the results of the search.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method of providing online information using image, the method comprising:
separating each of a target image, received from a user terminal, and an original image, received from an information provider apparatus, into a text region and a graphic region;
selecting an important text region from the text region based on the number of strokes to an area of the text region;

extracting features from the text region, the graphic region, and the important text region, respectively;

searching for the original image corresponding to the target image using the features of the text region, the graphic region, and the important text region; and searching for supplementary information related to the retrieved original image and provided the retrieved supplementary information, wherein the extracting of features from the graphic region comprises:

forming a graphic image formed of only the graphic region;

filling each of pixels of the graphic region from which the text region has been deleted, with a mean value of pixels of a graphic region that is closest to the graphic region; and extracting the features of the graphic region by applying a characteristic extraction algorithm to the graphic image.

2. A method of providing online information using image, the method comprising:

separating each of a target image, received from a user terminal, and an original image, received from an information provider apparatus, into a text region and a graphic region;

selecting an important text region from the text region based on the number of strokes to an area of the text region;

extracting features from the text region, the graphic region, and the important text region, respectively;

searching for the original image corresponding to the target image using the features of the text region, the graphic region, and the important text region; and searching for supplementary information related to the retrieved original image and provided the retrieved supplementary information, wherein the extracting of features from the text region comprises:

forming a text image composed of only the text region;

filling the text region and the graphic region of the text image with a single present color; and extracting the features of the text region by applying a characteristic extraction algorithm for an image search to the text image.

* * * * *